United States Patent [19]

Nakamura et al.

[11] Patent Number: 5,246,973

[45] Date of Patent: Sep. 21, 1993

[54] FOAMABLE SILICONE RUBBER COMPOSITION

[75] Inventors: Akito Nakamura; Yuichi Tsuji, both of Chiba, Japan

[73] Assignee: Dow Corning Toray Silicone Co., Ltd., Tokyo, Japan

[21] Appl. No.: 9,517

[22] Filed: Jan. 27, 1993

[30] Foreign Application Priority Data

Jan. 30, 1992 [JP] Japan ................................. 4-040083

[51] Int. Cl.$^5$ .............................................. C08J 9/32
[52] U.S. Cl. ........................................ 521/54; 521/91; 521/92; 521/134; 521/138; 521/139; 521/140; 521/154
[58] Field of Search ...................... 521/54, 91, 92, 134, 521/138, 139, 140, 154

[56] References Cited

U.S. PATENT DOCUMENTS

| | | | |
|---|---|---|---|
| 3,615,972 | 10/1971 | Morehouse, Jr. et al. | 521/56 |
| 4,044,176 | 8/1977 | Wolinski et al. | 521/145 |
| 5,086,088 | 2/1992 | Kitano et al. | 522/170 |

*Primary Examiner*—Morton Foelak
*Attorney, Agent, or Firm*—William F. Boley

[57] ABSTRACT

The introduction of a foamable silicone rubber composition that evolves neither toxic gas nor hydrogen, that does not suffer from inhibition of its cure to give silicone rubber, and that cures to give a silicone rubber foam containing uniform microcells. The foamable silicone rubber composition comprises:

(A) 100 weight parts thermosetting liquid silicone rubber composition, and
(B) 0.1 to 30 weight parts thermally expansible hollow plastic microparticles.

27 Claims, No Drawings

FOAMABLE SILICONE RUBBER COMPOSITION

BACKGROUND OF INVENTION

The present invention relates to a foamable silicone rubber composition.

Silicone rubber foams are light and offer an excellent heat resistance and weather resistance. Based on these properties, silicone rubber foams have entered into wide use, most importantly in the automobile parts sector. Silicone rubber foams are specifically used as various types of seals, packings, gaskets, O-rings, and so forth.

Methods for the preparation of these silicone rubber foams include (i) the addition of a thermally decomposable blowing agent to a thermosetting silicone rubber composition and (ii) the utilization of hydrogen generated as a curing by-product. A problem with the former method (addition of thermally decomposable blowing agent) is the toxicity and odor of the associated decomposition gas. Another problem with the former method is inhibition of the cure by the blowing agent when a platinum catalyst is used as the curing catalyst. Problems with the latter method (utilization of hydrogen generated as a curing by-product) are the explosive nature of hydrogen and the caution that must be exercised in handling during storage of the uncured mass. A further problem with both methods is that the cells in the silicone rubber foams produced by them are large and nonuniform. These methods essentially cannot give silicone rubber foams that have uniform, microscopic cells.

The present inventors carried out investigations directed at solving the aforementioned problems. They discovered as a result that the addition of specific hollow plastic microparticles to a liquid silicone rubber composition makes possible the production of a silicone rubber foam having uniform microcells without the generation of hydrogen or toxic gases during the foaming process. The present invention was achieved based on this finding.

SUMMARY OF INVENTION

The present invention takes as its object the introduction of a foamable silicone rubber composition that does not generate toxic gas or hydrogen during its cure, that does not suffer from inhibition of the cure of the silicone rubber itself, and that cures to give a silicone rubber foam having uniform microcells. The aforesaid object can be achieved by means of a foamable silicone rubber composition which comprises (A) 100 weight parts thermosetting liquid silicone rubber composition, and (B) 0.1 to 30 weight parts thermally expansible hollow plastic microparticles.

DESCRIPTION OF INVENTION

The foamable silicone rubber composition of the present invention comprises:
(A) 100 weight parts of a thermosetting liquid silicone rubber composition, and
(B) 0.1 to 30 weight parts of thermally expansible hollow plastic microparticles.

The thermosetting liquid silicone rubber composition comprising the component (A) used by the present invention should be a liquid at room temperature and should cure by heating to yield a rubbery elastic silicone rubber, but its nature, description, and so forth are not otherwise specifically restricted.

The aforesaid thermosetting liquid silicone rubber composition comprising component (A) is exemplified by the following: addition-reaction-curing liquid silicone rubber compositions that are composed of alkenyl-containing diorganopolysiloxane, SiH-containing organohydrogenpolysiloxane, and reinforcing filler and that are cured by platinum group metal catalysts to yield silicone rubber; organoperoxide-curing liquid silicone rubber compositions that are composed of alkenyl-containing diorganopolysiloxane and reinforcing filler and that are cured by organoperoxide to yield silicone rubber; and condensation-reaction curing liquid silicone rubber compositions that are composed of OH-containing diorganopolysiloxane, SiH-containing organohydrogenpolysiloxane, and reinforcing filler and that are cured to yield silicone rubber by condensation-reaction catalysts such as organotin compounds, organotitanium compounds, platinum group metal catalysts, etc. Among these the addition-reaction-curing liquid silicone rubber compositions are preferred for their high cure rate and very uniform cure.

These addition-reaction-curing liquid silicone rubber compositions are specifically exemplified by liquid silicone rubber compositions comprising:
(a) a diorganopolysiloxane that contains at least 2 alkenyl groups in each polymer chain,
(b) an organopolysiloxane that contains at least 2 silicon-bonded hydrogen atoms in each polymer chain, and
(c) a platinum group metal catalyst.

To explain this addition-reaction-curing liquid silicone rubber composition in greater detail, the diorganopolysiloxane comprising component (a) must contain at least 2 silicon-bonded alkenyl groups in each polymer chain. The component (a) diorganopolysiloxane's alkenyl groups are nonexhaustively exemplified by vinyl, allyl, and propenyl. The component (a) diorganopolysiloxane's non-alkenyl organic groups are nonexhaustively exemplified by alkyl groups such as methyl, ethyl, and propyl; aryl groups such as phenyl and tolyl: and substituted alkyl groups such as 3,3,3-trifluoropropyl and 3-chloropropyl. The molecular configuration of the component (a) diorganopolysiloxane may be straight chain or branch-containing straight chain. The molecular weight of the component (a) diorganopolysiloxane is not specifically restricted; however, in order to obtain a rubbery elastic cured product, this component is preferably a straight-chain diorganopolysiloxane with a viscosity of at least 100 centipoise at 25° C. The present invention can also use mixtures of two or more types of the component (a) diorganopolysiloxane.

The organopolysiloxane comprising component (b) is a crosslinker, and crosslinking and curing proceed in the presence of the platinum group metal catalyst of component (c) by the addition reaction of the silicon-bonded hydrogen atoms in the component (b) organopolysiloxane with the silicon-bonded alkenyl groups in the component (a) diorganopolysiloxane. The component (b) organopolysiloxane must contain at least 2 silicon-bonded hydrogen atoms in each polymer chain. In addition to silicon-bonded hydrogen, the organic groups of the component (b) organopolysiloxane are nonexhaustively exemplified by alkyl groups such as methyl, ethyl, and propyl; aryl groups such as phenyl and tolyl and substituted alkyl groups such as 3,3,3-trifluoropropyl and 3-chloropropyl.

The molecular structure of the component (b) organopolysiloxane may be straight chain branch-containing straight chain, cyclic, or network. While the molecular weight of the component (b) organopolysiloxane is not particularly restricted, its viscosity at 25° C. is preferably 3 to 10,000 centipoise. It is preferred that the component (b) organopolysiloxane be added in a quantity that affords values of (0.5:1) to (20:1) and preferably (1:1) to (3:1) for the molar ratio between the silicon-bonded hydrogen atoms in the component (b) organopolysiloxane and the silicon-bonded alkenyl groups in the component (a) diorganopolysiloxane. A good curability is not obtained when this molar ratio falls below 0.5. On the other hand, the hardness of the cured silicone rubber foam may be too high when this molar ratio exceeds 20.

The platinum group metal catalyst comprising component (c) is a curing catalyst for the composition of the present invention. The component (c) platinum group metal catalyst is exemplified by platinum micropowder, platinum black, chloroplatinic acid, platinum tetrachloride, olefin complexes of chloroplatinic acid, alcohol solutions of chloroplatinic acid, complexes between chloroplatinic acid and alkenylsiloxanes, rhodium compounds, and palladium compounds.

When it is desired to extend the use time of the liquid silicone rubber composition,. the component (c) platinum group metal catalyst may take the form of thermoplastic resin microparticles that contain a platinum group metal catalyst as described above. The component (c) platinum group metal catalyst is generally used at 0.1 to 500 weight parts and preferably at 1 to 50 weight parts as platinum group metal for each 1,000,000 weight parts the component (a) diorganopolysiloxane. Development of the addition reaction may be inadequate at below 0.1 weight parts while additions in excess of 500 weight parts may be uneconomical.

The thermosetting liquid silicone rubber composition under consideration may contain various fillers in order to adjust the flowability and improve the mechanical strength of the cured product. These fillers are exemplified by reinforcing fillers such as precipitated silica, fumed silica, calcined silica, fumed titanium oxide, and so forth; nonreinforcing fillers such as quartz powder, diatomaceous earth, asbestos, aluminosilicic acids, iron oxide, zinc oxide, calcium carbonate, and so forth; and the preceding fillers after treatment with an organosilicon compound such as an organosilane, organopolysiloxane, and so forth. Insofar as the object of the present invention is not impaired, the organopolysiloxane composition of the present invention may contain trace or small quantities of an additive that inhibits the curing reaction, i.e., acetylenic compounds, hydrazines, triazoles, phosphines, and mercaptans. The following may also be added on an optional basis: pigments, heat stabilizers, flame retardants, plasticizers, adhesion promoters, etc.

The hollow plastic microparticle comprising the component (B) used in the present invention is the component that characterizes or distinguishes the present invention. This hollow plastic microparticle functions as a blowing agent or foaming agent that causes the composition of the present invention to yield a foam. The critical feature of this hollow plastic microparticle is its thermal expansibility. The plastic making up the shell of this hollow plastic microparticle should be selected so its softening temperature will fall within a suitable range that is adapted to the curing temperature of the liquid silicone rubber composition of component (A). These plastics are nonexhaustively exemplified by vinyl polymers from ethylene, styrene, vinyl acetate, vinyl chloride, vinylidene chloride, acrylonitrile, butadiene, and chloroprene and by their copolymers; by polyamides such as nylon 6 and nylon 66; and by polyesters such as polyethylene terephthalate. Moreover, for the purpose of increasing their expansion ratio, the interior of the hollow plastic microparticle preferably contains a volatile substance, such as a volatile solvent or gas, as a foaming agent. Said volatile substances are exemplified by hydrocarbons such as butane, isobutane, etc. The component (B) hollow plastic microparticle generally has a particle size within the range of 1 to 50 micrometers and its morphology is generally spherical; however, these properties are not specifically restricted.

The component (B) hollow plastic microparticle should be added at 0.1 to 30 weight parts per 100 weight parts of the component (A) thermosetting liquid silicone rubber composition. The component (B) hollow plastic microparticle is preferably added to the thermosetting liquid silicone rubber composition in a quantity that affords a silicone rubber foam with a specific gravity of 0.1 to 0.9.

The composition of the present invention can be prepared simply by mixing or kneading the aforesaid component (A) thermosetting liquid silicone rubber composition and component (B) hollow plastic microparticle and any optional additives into a homogeneous mass. In order to avoid thermal rupture of the component (B) hollow plastic microparticles, this mixing or kneading is preferably carried out below the softening point of the plastic making up the hollow plastic microparticles of component (B).

Because the foamable silicone rubber composition according to the present invention is composed of component (A) thermosetting liquid silicone rubber composition and component (B) thermally expansible hollow plastic microparticles, and in particular because it contains the thermally expansible hollow plastic microparticles comprising component (B), this composition has the following characteristic features: it does not produce toxic gas or hydrogen during its cure; it does not suffer from inhibition of its cure into silicone rubber: and it cures to give a silicone rubber foam having uniform, microscopic cells.

The present invention will be explained below in greater detail through illustrative examples. In the examples, parts designates weight parts and the reported viscosity is the value at 25° C.

EXAMPLE 1

The following were combined and mixed to homogeneity: 100 parts dimethylvinylsiloxy-endblocked dimethylpolysiloxane (viscosity=2,000 centipoise, vinyl group content=0.23 weight %), 20 parts quartz powder with average particle diameter=5 microns, 30 parts fumed silica with specific surface area=200 m²/g, 5 parts hexamethyldisilazane (silica surface treatment agent), and 2 parts water. Subsequent heat-treatment in vacuo afforded a flowable liquid silicone rubber base. The following were then mixed to homogeneity into 100 parts of this liquid silicone rubber base to give a liquid silicone rubber composition: 2 parts trimethylsiloxy-endblocked dimethylsiloxane-methylhydrogensiloxane copolymer (silicon-bonded hydrogen content=0.8 weight %), 0.4 parts of a platinum complex between chloroplatinic acid and divinyltetramethyldisiloxane (platinum concentration=0.4 weight %), and 0.2 parts 3,5-dimethyl-1-hexyn-3-ol as curing inhibitor. This liquid silicone rubber composition had a viscosity of 3,000 poise. A foamable liquid silicone rubber composition was obtained by mixing 100 weight parts of this liquid silicone rubber composition to homogeneity with 5 parts vinylidene chloride/acrylonitrile copolymer hollow microspheres. The shell or skin of these microspheres was made of vinylidene chloride/acrylonitrile copolymer, and their interior contained isobutane. They had a particle size of 5 to 30 micrometers, and their expansion temperature was 90° C. to 120° C. This product was commercially available as WU #642 from the Expancel Company of Sweden or Japan Fillite Company of Osaka, Osaka, Japan.

A silicone rubber foam was obtained by introducing this composition into a 140° C. oven in order to bring about thermosetting. The resulting silicone rubber foam was sectioned and its cross section was subjected to microscopic evaluation. The cells present in this foam had diameters in the range of 10 to 100 micrometers. This silicone rubber foam had a specific gravity of 0.38 and a hardness of 35 as measured by Japanese Industrial Standard A (JIS A). In order to investigate the use time and storage stability of the foamable liquid silicone rubber composition, it was also held for 24 hours at room temperature and then evaluated as before. In this case, the cells in the silicone rubber foam had diameters in the range of 10 to 100 micrometers, and the silicone rubber foam itself had a specific gravity of 0.40 and a hardness of 36 (JIS A).

COMPARISON EXAMPLE 1

A foamable liquid silicone rubber composition was prepared as in Example 1, but in this case 2.0 parts of an organic blowing agent was homogeneously admixed in place of the 5 parts vinylidene chloride/acrylonitrile copolymer hollow microspheres used in Example 1. This organic blowing agent was a mixture of azodicarbonamide and dinitrosopentamethylenetetramine that had a decomposition temperature of 122° C. (Vinyhol AK #2 from Eiwa Kasei Kogyo Kabushiki Kaisha of Kyoto, Kyoto, Japan). This composition was cured as in Example 1 to give a silicone rubber foam. The cells in this foam had diameters of at least 50 micrometers and their spherical form was very irregular, and this foam was not uniform. This foamable liquid silicone rubber composition was also held for 24 hours at room temperature in order to evaluate its use time and storage stability. When the composition was then evaluated as in Example 1, it was found that the foamable silicone rubber composition did not cure.

EXAMPLE 2

A foamable liquid silicone rubber composition was prepared as in Example 1. However, the present example used 3 parts vinylidene chloride/acrylonitrile copolymer hollow microspheres with expansion temperature of 80° C. to 135° C. and particle diameter of 10 to 20 micrometers (Matsumoto Microsphere F-30D from Matsumoto Yushi Seiyaku Kabushiki Kaisha of Yao, Osaka, Japan) that were internally loaded with a mixture of low-boiling hydrocarbons. This product was used in place of the isobutane-loaded vinylidene chloride/acrylonitrile copolymer hollow microspheres used in Example 1.

This composition was cured as in Example 1 to give a silicone rubber foam. This silicone rubber foam was sectioned and its cross section was subjected to microscopic analysis. The cells present in this foam had diameters in the range of 30 to 60 micrometers. The silicone rubber foam itself had a specific gravity of 0.46 and a hardness of 43 (JIS A). In order to evaluate the use time and storage stability of the foamable liquid silicone rubber composition, it was also held for 24 hours at room temperature and then evaluated as before. In this case, the cells in the silicone rubber foam had diameters in the range of 30 to 60 micrometers, and the silicone rubber foam had a specific gravity of 0.47 and a hardness of 45 (JIS A).

EXAMPLE 3

The following were combined and mixed to homogeneity to give a flowable liquid silicone rubber base: 100 parts dimethylvinylsiloxy-endblocked dimethylpolysiloxane with viscosity of 10,000 centipoise and vinyl content of 0.14 weight % and 25 parts of fumed silica with specific surface area of 200 m²/g whose surface had been treated with hexamethyldisilazane. The following were then mixed to homogeneity into 100 parts of this liquid silicone rubber base to give a liquid silicone rubber composition: 1.7 parts trimethylsiloxy-endblocked dimethylsiloxane-methylhydrogensiloxane copolymer (silicon-bonded hydrogen content=0.8 weight %), 0.5 parts of a thermoplastic silicone resin spherical microparticulate catalyst (from Toray Dow Corning Silicone Company, Limited of Chuo-ku, Tokyo, Japan, softening point of the thermoplastic silicone resin=85° C., platinum concentration=0.4 weight %), and 0.07 parts 3,5-dimethyl-1-hexyn-3-ol as curing inhibitor. This liquid silicone rubber composition had a viscosity of 2,000 poise. A foamable silicone rubber composition was obtained by mixing 100 weight parts of this liquid silicone rubber composition to homogeneity with 10 parts vinylidene chloride/acrylonitrile copolymer hollow microspheres (DU #551 from the Expancel Company). The shell of these microspheres was made of vinylidene chloride/acrylonitrile copolymer, and their interior contained isobutane. They had a particle size of 5 to 30 micrometers, and their expansion temperature was 90° C. to 120° C.

A silicone rubber foam was prepared by thermosetting this composition by placing and holding it in a 120° C. oven. The resulting silicone rubber foam was sectioned and its cross section was subjected to microscopic evaluation. The cells present in this foam had diameters in the range of 10 to 100 micrometers. The silicone rubber foam had a specific gravity of 0.34 and a hardness of 35 (JIS A). In order to evaluate the use time and storage stability of this foamable liquid silicone rubber composition, it was held for 24 hours at room temperature and then evaluated as in Example 1. The cells in the resulting silicone rubber foam had diameters in the range of 10 to 100 micrometers. This silicone rubber foam had a specific gravity of 0.37 and a hardness of 31 (JIS A).

COMPARISON EXAMPLE 2

A flowable liquid silicone rubber composition was prepared as in Example 3 with the following modifications: the vinylidene chloride/acrylonitrile copolymer hollow microspheres were omitted, and 100 parts hydroxyl-endblocked dimethylpolysiloxane (viscosity=13,000 centipoise, hydroxyl group content=0.08 weight %) was used in place of the dimethylvinylsiloxy-endblocked dimethylpolysiloxane (viscosity=10,000 centipoise) used in Example 3. This liquid silicone rubber composition was of the type that would give a silicone rubber foam by the generation of hydrogen during the curing reaction.

A silicone rubber foam was prepared by thermosetting this composition as in Example 3. This silicone rubber foam was sectioned and its cross section was subjected to microscopic observation. The foam contained a large number of cells with diameters ≧1 mm, and the cells were nonuniform.

That which is claimed is:

1. A foamable silicone rubber composition, comprising:
   (A) 100 weight parts of a thermosetting liquid silicone rubber composition, and
   (B) 0.1 to 30 weight parts of thermally expansible hollow plastic microparticles.

2. A foamable silicone rubber composition according to claim 1, wherein the thermosetting liquid silicone rubber composition comprising component (A) is selected from a group consisting of addition-reaction-curing liquid silicone rubber compositions, organoperoxide-curing liquid silicone rubber compositions, and condensation-reaction-curing liquid silicone rubber compositions.

3. A foamable silicone rubber composition according to claim 1, wherein the thermosetting liquid silicone rubber composition comprising component (A) comprises:
   (a) a diorganopolysiloxane that contains at least 2 alkenyl groups in each polymer chain,
   (b) an organopolysiloxane that contains at least 2 silicon-bonded hydrogen atoms in each polymer chain, and
   (c) a platinum group metal catalyst.

4. A foamable silicone rubber composition according to claim 3, wherein each alkenyl group of the diorganopolysiloxane is independently selected from a group consisting of vinyl, allyl, and propenyl.

5. A foamable silicone rubber composition according to claim 3, wherein the diorganopolysiloxane contains at least one nonalkenyl group in each polymer chain, and each nonalkenyl group is independently selected from a group consisting of alkyl, aryl, and substituted alkyl.

6. A foamable silicone rubber composition according to claim 3, wherein the diorganopolysiloxane has a straight chain molecular configuration and has a viscosity of at least 100 centipoise at 25° C.

7. A foamable silicone rubber composition according to claim 3, wherein each organic group of the organopolysiloxane that contains at least two silicon-bonded hydrogen atoms is independently selected from a group consisting of alkyl, aryl and substituted alkyl.

8. A foamable silicone rubber composition according to claim 3, wherein the viscosity of the organopolysiloxane that contains at least two silicon-bonded hydrogen atoms is in a range of about 3 to 10,000 centipoise at 25° C.

9. A foamable silicone rubber composition according to claim 3, wherein the molar ratio of silicon-bonded hydrogen atoms in the organopolysiloxane that contains at least two silicon-bonded hydrogen atoms to silicon-bonded alkenyl groups in the diorganopolysiloxane is within a range of about 0.5:1 to 20:1.

10. A foamable silicone rubber composition according to claim 3, wherein the molar ratio of silicon-bonded hydrogen atoms in the organopolysiloxane that contains at least two silicon-bonded hydrogen atoms to silicon-bonded alkenyl groups in the diorganopolysiloxane is within a range of about 1:1 to 3:1.

11. A foamable silicone rubber composition according to claim 3, wherein the platinum group metal catalyst is selected from a group consisting of platinum micropowder, platinum black, chloroplatinic acid, platinum tetrachloride, olefin complexes of chloroplatinic acid, alcohol solutions of chloroplatinic acid, complexes between chloroplatinic acid and alkenylsiloxanes, rhodium compounds, and palladium compounds.

12. A foamable silicone rubber composition according to claim 3, wherein the platinum group metal catalyst is in the form of a thermoplastic resin microparticle containing a platinum group metal selected from a group consisting of platinum micropowder, platinum black, chloroplatinic acid, platinum tetrachloride, olefin complexes of chloroplatinic acid, alcohol solutions of chloroplatinic acid, complexes between chloroplatinic acid and alkenylsiloxanes, rhodium compounds, and palladium compounds.

13. A foamable silicone rubber composition according to claim 3, comprising 0.1 to 500 weight parts of the platinum group metal catalyst for each 1,000,000 weight parts of the diorganopolysiloxane.

14. A foamable silicone rubber composition according to claim 3, comprising 1 to 50 weight parts of the platinum group metal catalyst for each 1,000,000 weight parts of the diorganopolysiloxane.

15. A foamable silicone rubber composition according to claim 1, wherein plastic of the thermally expansible hollow plastic microparticles of component (B) is selected from a group consisting of vinyl polymers, vinyl copolymers, polyamides, and polyesters.

16. A foamable silicone rubber composition according to claim 15, wherein the plastic is selected from a group consisting of ethylene, styrene, vinyl acetate, vinyl chloride, vinylidene chloride, acrylonitrile, butadiene, chloroprene, and their copolymers.

17. A foamable silicone rubber composition according to claim 15, wherein the plastic is selected from a group consisting of nylon 6 and nylon 66.

18. A foamable silicone rubber composition according to claim 15, wherein the plastic is polyethylene terephthalate.

19. A foamable silicone rubber composition according to claim 1, wherein plastic of the thermally expansible hollow plastic microparticles of component (B) is selected from a group consisting of vinyl polymers, vinyl copolymers, polyamides, and polyesters; and the thermally expansible hollow plastic microparticle contains a volatile substance.

20. A foamable silicone rubber composition according to claim 19, wherein the plastic is selected from a group consisting of ethylene, styrene, vinyl acetate, vinyl chloride, vinylidene chloride, acrylonitrile, butadiene, chloroprene, and their copolymers.

21. A foamable silicone rubber composition according to claim 19, wherein the plastic is selected from a group consisting of nylon 6 and nylon 66.

22. A foamable silicone rubber composition according to claim 19, wherein the plastic is polyethylene terephthalate.

23. A foamable silicone rubber composition according to claim 19, wherein the volatile substance is selected from a group consisting of a solvent and a gas.

24. A foamable silicone rubber composition according to claim 19, wherein the volatile substance is selected from a group consisting of butane and isobutane.

25. A foamable silicone rubber composition according to claim 1, wherein the thermally expansible hollow plastic microparticles are spherical in shape and are within a range of about 1 to 50 micrometers in size.

26. A foamable silicone rubber composition according to claim 1, wherein the liquid silicone rubber composition comprising component (A) contains a filler selected from a group consisting of precipitated silica, fumed silica, calcined silica, and fumed titanium oxide.

27. A foamable silicone rubber composition according to claim 3, wherein the thermally expansible hollow plastic microparticle contains the platinum group metal catalyst and a volatile substance.

* * * * *